United States Patent [19]

Krings et al.

[11] Patent Number: 5,847,858

[45] Date of Patent: Dec. 8, 1998

[54] ELECTROCHROMIC ELEMENT

[75] Inventors: Leo H. M. Krings; Emmanuel W. J. L. Oomen, both of Eindhoven, Netherlands

[73] Assignee: U.S. Philips Corporation, New York, N.Y.

[21] Appl. No.: 762,683

[22] Filed: Dec. 11, 1996

[30] Foreign Application Priority Data

Dec. 15, 1995 [EP] European Pat. Off. .............. 95203511

[51] Int. Cl.$^6$ ................................................. G02B 17/00
[52] U.S. Cl. .......................... 359/265; 359/267; 359/262; 359/271; 359/273
[58] Field of Search ................................. 359/265, 267, 359/262, 271, 273

[56] References Cited

U.S. PATENT DOCUMENTS

| | | | |
|---|---|---|---|
| 4,231,641 | 11/1980 | Randin | 350/357 |
| 4,652,090 | 3/1987 | Uchikawa | 350/357 |
| 4,824,222 | 4/1989 | Green | 350/357 |

*Primary Examiner*—Frank G. Font
*Assistant Examiner*—Reginald A. Ratliff
*Attorney, Agent, or Firm*—Norman N. Spain

[57] ABSTRACT

The electrochromic element comprises an electrochromic layer (22) whose transmission properties change when a voltage difference is applied across the element. Said electrochromic layer (22) comprises a first metal oxide of the group formed by $WO_3$, $MoO_3$, $Nb_2O_5$, $MnO_2$ and $ZrO_2$ (and combinations thereof) and a second metal oxide containing $V_2O_5$, $TiO_2$ and/or $ZnO$. If the concentration of the second metal in the mixture ranges from 1 to 15 at. %, preferably from 3 to 10 at. %, the electrochromic layer (22) is transparent and colorless if no guest atoms are incorporated in the layer, and it is (color neutral) grey if a substantial concentration of guest atoms is incorporated in the layer.

Electrochromic elements are provided, for example, on the outer surface of a display screen of a display device.

10 Claims, 3 Drawing Sheets

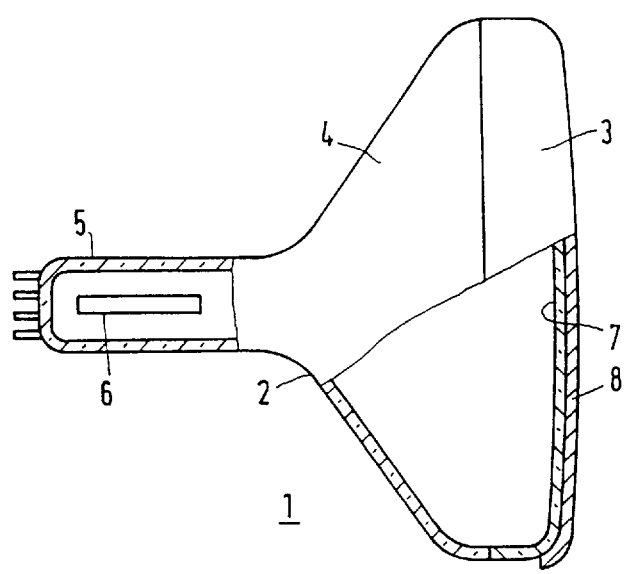
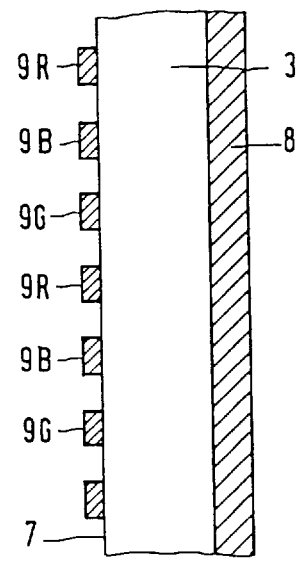
FIG.1A    FIG.1B
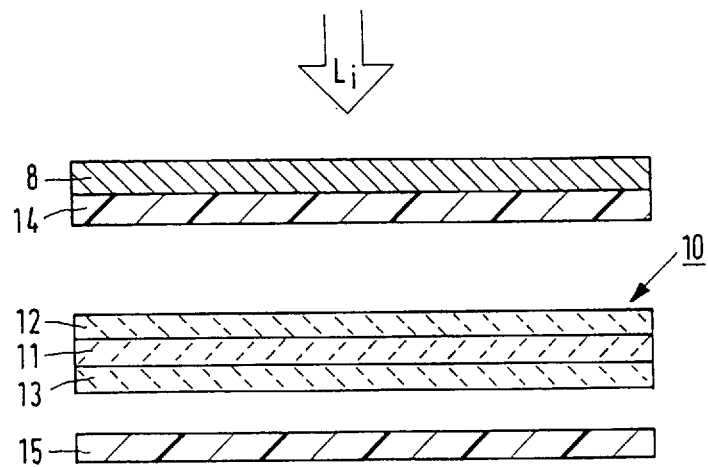
FIG.2

ELECTROCHROMIC ELEMENT

BACKGROUND OF THE INVENTION

The invention relates to an electrochromic element comprising an electrochromic layer, the transmission properties of said electrochromic layer in the visible region undergoing a change when a voltage difference is applied across the element.

The invention further relates to a display device which is provided with a display screen and with an electrochromic element.

Electrochromic elements are used to influence the transmission or reflection of light, for example, of lamps, of rear view mirrors and of sunroofs for cars, or of windows for buildings (smart windows). They are also used, for example, in (flat-panel) display devices, such as cathode ray tubes (CRT) and liquid-crystal display devices (LCD, LC-TV and plasma-addressed LCD) to improve the contrast of the image reproduced.

Electrochromic layers reduce the intensity of reflected ambient light and the intensity of light originating from an (internal) light source, such as the phosphors in a CRT. Incident ambient light passes through the light-absorbing layer and is reflected at the display screen whereafter the reflected light passes through the light-absorbing layer again. If the transmission of the light-absorbing layer amounts to T, the intensity of the reflected ambient light is reduced by a factor of $T^2$. Light originating from the internal light source(s), however, passes through the light-absorbing layer only once, so that the intensity of this light is reduced only by a factor of T. The combination of these effects leads to an increase of the contrast by a factor of $T^{-1}$.

Oxides of specific transition metals are capable of accepting guest atoms such as hydrogen and alkali-metal atoms. If the oxide forms part of an electrochemical cell, the guest atoms can be accepted and released again in a reversible manner.

An electrochromic element of the type mentioned in the opening paragraph is known from U.S. Pat. No. 4,824,222. In said Specification, a description is given of an electrochromic element comprising an electrochromic layer containing the electrochromic material tungsten-oxide ($WO_3$). The transmission of the electrochromic layer in the visible region changes when a voltage difference is applied across a so-called electrochromic cell, which comprises a first electrode, which is connected to the electrochromic layer, and a further electrode, which contains a material which serves as a source and as an acceptor for the guest atoms, and an ion-conducting material being present between said two electrodes. Said further electrode is often referred to as the counter electrode.

A disadvantage of the known electrochromic element is that a change in the concentration of the guest atoms in the oxide generally leads to a change in the light absorption of the electrochromic layer, which is accompanied by a change of the visible color of the oxide. A change of the light absorption accompanied by a change of a visible color is disturbing, in particular, for displaying color images by means of a display device. The selective absorption of one or more colors by the oxide causes the ratio between the intensities of the primary colors (emitted, for example, by the phosphors) to be influenced, which results in color differences, as a result of which, for example, white is perceived as bluish white, which is very disturbing.

OBJECTS AND SUMMARY OF THE INVENTIION

It is an object of the invention to provide an electrochromic element whose transmission properties undergo a reversible change from (colorless) transparent to (color neutral) grey, when a voltage difference is applied across the element.

To this end, the electrochromic element in accordance with the invention is characterized in that the electrochromic element comprises a mixture of a first metal oxide of a metal selected from the group formed by tungsten, molybdenum, niobium, manganese, zirconium, and combinations thereof, and of a second metal oxide of a metal selected from the group formed by vanadium, titanium, zinc, and combinations thereof, and in that the concentration of the second metal, expressed as a percentage of the total number of metal atoms in the mixture, ranges from 1 to 15 at. %.

The inventors have recognized that an electrochromic layer comprising a first metal oxide of the group formed by $WO_3$, $MoO_3$, $Nb_2O_5$, $MnO_2$ and $ZrO_2$ (and combinations thereof), and a second metal oxide containing $V_2O_5$, $TiO_2$ and/or ZnO, the concentration of the second metal in the mixture ranging, in particular, from 1 to 15 at. %, yields an electrochromic layer which is transparent and colorless if no guest atoms are incorporated in the layer, and the transmission properties of which change to (color-neutral) grey, (at least) in the visible region, if a considerable concentration of guest atoms is incorporated in the layer when a voltage difference is applied across the element. The concentration of the second metal in the mixture is expressed relative to the total number of metal atoms in the mixture of the first metal oxide and the second metal oxide.

If the concentration of the second metal in the mixture of the first metal oxide and the second metal oxide is smaller than approximately 1 at. %, the electrochromic layer predominantly has the properties of the first metal oxide. For example, a (thin) layer of $WO_3$, which contains less than, approximately, 1 at. % of, for example, the metal oxide $V_2O_5$, behaves substantially like $WO_3$ and undergoes a change from colorless to blue, the intensity depending on the concentration of the guest atoms, when a voltage difference is applied across the element.

If the concentration of the second metal in the mixture of the first metal oxide and the second metal oxide exceeds 15 at. %, (a thin layer of) the mixture forms an electrochromic layer, which is colorless if no guest atoms are incorporated in the mixture and which remains colorless even if a considerable concentration of guest atoms is incorporated in the layer. It is noted, that in the known electrochromic element (U.S. Pat. No. 4,824,222), use is not only made of the electrochromic layer but also of a so-called counter electrode, which comprises a mixture of a first metal oxide of the group formed by $MoO_3$, $WO_3$, $ZrO_2$, $Nb_2O_5$ and combinations thereof, and a second metal oxide containing $V_2O_5$ and/or $TiO_2$. However, the composition of this counter electrode is such that said counter electrode has no effect on the transmission properties of the electrochromic element. In particular, the ratio of the first metal oxide to the second metal oxide is selected so that the counter electrode is, and remains, essentially colorless, even if a substantial concentration of guest atoms is incorporated in said counter electrode. In (the counter electrode of) the known element, the "formula ratio" of the first metal oxide ($MoO_3$ or $WO_3$) and the second metal oxide ($V_2O_5$) is such that it corresponds to a concentration of the second metal (vanadium), expressed as a percentage of the total number of metal atoms in the mixture, which is (far) outside the concentration range in accordance with the invention.

An embodiment of the electrochromic element in accordance with the invention is characterized in that the concentration of the second metal in the mixture ranges from 3 to 10 at. %. By virtue thereof, a further improvement of the color neutrality of the electrochromic layer is achieved. A further advantage is that also during the change of the transmission properties in the visible region, the layer does not exhibit discoloration, i.e. the layer changes from (colorless) transparent to grey in a color-neutral manner.

For the first metal oxide of the mixture, use is preferably made of tungsten oxide ($WO_3$), and for the second metal oxide of the mixture, use is preferably made of vanadium oxide ($V_2O_5$).

A preferred embodiment of the electrochromic element in accordance with the invention is characterized in that the color-point coordinates (x,y) of the electrochromic layer are situated in the C.I.E. color triangle, between 0.3 and 0.37, preferably between 0.31 and 0.35. A layer having such a color point exerts little influence on the color(s) of the image reproduced by the display device.

A further embodiment of the electrochromic element in accordance with the invention is characterized in that the transmission of the electrochromic layer in the visible region changes gradually. If the transmission properties of the layer change insufficiently gradually in the visible region, for example in the spectral range in which emission of the electroluminescent phosphors takes place, color effects will occur, which are generally undesirable.

A particular embodiment of the electrochromic element in accordance with the invention is characterized in that the minimum transmission of the electrochromic layer is 15 %. Another desirable property of the electrochromic layer is that, upon application of the voltage difference, a change in the transmission of the electrochromic layer takes place in less than 5 minutes, preferably less than 1 minute.

These and other aspects of the invention will be apparent from and elucidated with reference to the embodiments described hereinafter.

BRIEF DESCRIPTION OF THE DRAWINGS

In the drawings:

FIG. 1A is a partly cut-away view of a display device comprising a cathode ray tube;

FIG. 1B is a cross-sectional view of a detail of FIG. 1A;

FIG. 2 is a cross-sectional view of a liquid-crystal display device;

DESCRIPTION OF THE PREFERRED EMBODIMENTS

Figure 3A:
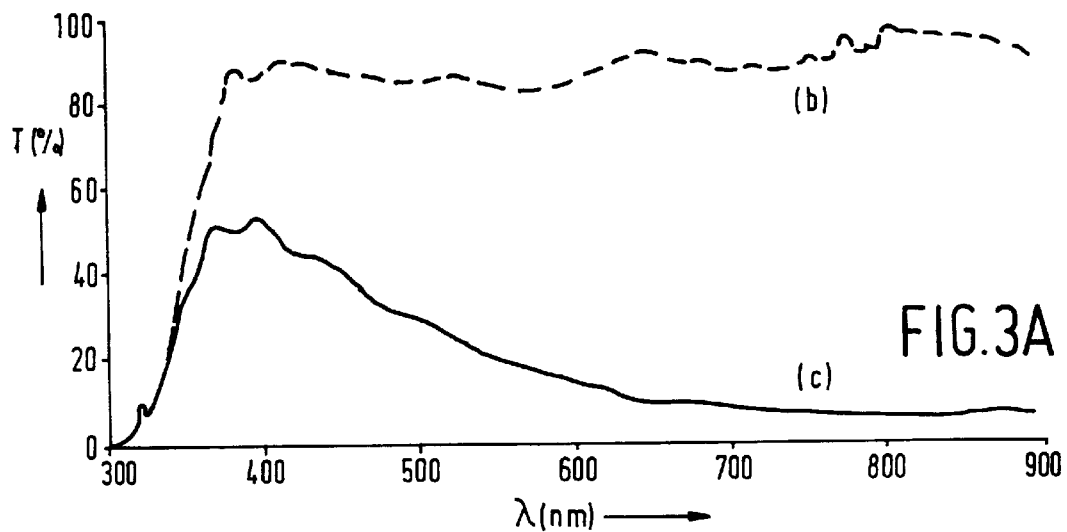
FIG. 3A shows the transmission spectrum as a function of the wavelength of an electrochromic layer $WO_3$, which includes less than 1 at. % of the metal oxide $V_2O_5$.

The Figures are purely schematic and not drawn to scale. In particular for clarity, some dimensions are exaggerated strongly.

FIG. 1A is a schematic, cut-away view of a cathode ray tube 1 having a glass envelope 2 including a display screen 3, a cone 4 and a neck 5. An electron gun 6 for generating one or more electron beams is situated in said neck. The electron beam is focused on a phosphor layer 7 on the inner surface of the display screen 3 and is deflected across said display screen 3 in two mutually perpendicular directions by means of a deflection coil system (not shown in FIG. 1A). On the outer surface, the display screen 3 is provided with an electrochromic element 8.

FIG. 1B is a cross-sectional view of a detail of FIG. 1A, in which a phosphor layer 7 comprises a regular pattern of electroluminescent spots 9R, 9G, 9B. Said spots 9R, 9G, 9B each contain a suitable phosphor of the right color: red 9R, green 9G or blue 9B. Preferably, the outer surface of the display screen 3 is provided with an electrochromic element 8. Element 8 at least comprises a material whose transmission properties in the visible region undergo a change when a voltage difference is applied across said element.

FIG. 2 is a schematic, cross-sectional view of a liquid-crystal color display device (LCD) having a number of liquid-crystal cells 10 for displaying colors, which display device comprises a liquid-crystalline layer 11 which is sandwiched between two electrode substrates 12, 13. The electrodes on the substrates 12, 13 are not shown in the figure. Besides, for convenience, only one liquid-crystal cell 10 is shown. In this case, the device comprises two polarizers 14, 15. Ambient light can enter the LCD both at the outer surface of polarizer 14 and at the outer surface of polarizer 15. In FIG. 2, the ambient light $L_i$ is incident on the outer surface of polarizer 14; in this case, an electrochromic element 8, as described hereinabove, is provided on the outer surface of polarizer 14.

FIG. 3A shows a transmission spectrum as a function of the wavelength ($\lambda$ in nm) of a (thin) electrochromic layer $WO_3$, which contains less than 1 at. % of the metal oxide $V_2O_5$. The spectrum, designated (b), corresponds to the state in which no guest atoms are incorporated in the electrochromic layer ("bleached state"); the spectrum, designated (c), corresponds to the state in which a (substantial) concentration of guest atoms is incorporated in the electrochromic layer ("colored state"). In the example of FIG. 3A, the thickness of the electrochromic layer is approximately 650 nm and spectrum (c) is recorded, after the layer has been intercalated for approximately 50 seconds at a voltage of 2.0 V, i.e. a (considerable) concentration of guest atoms is incorporated in the layer. In the uncolored state (b), the layer is transparent and colorless (the wave motions in the transmission spectrum are caused by interference effects, which are connected with the thickness and the refractive index of the layer), whereas in the colored state (c), the electrochromic layer behaves like a layer of pure $WO_3$, i.e. said layer has the blue color characteristic of tungsten oxide, without the influence of the small vanadium-oxide concentration being noticeable.

Figure 3B:
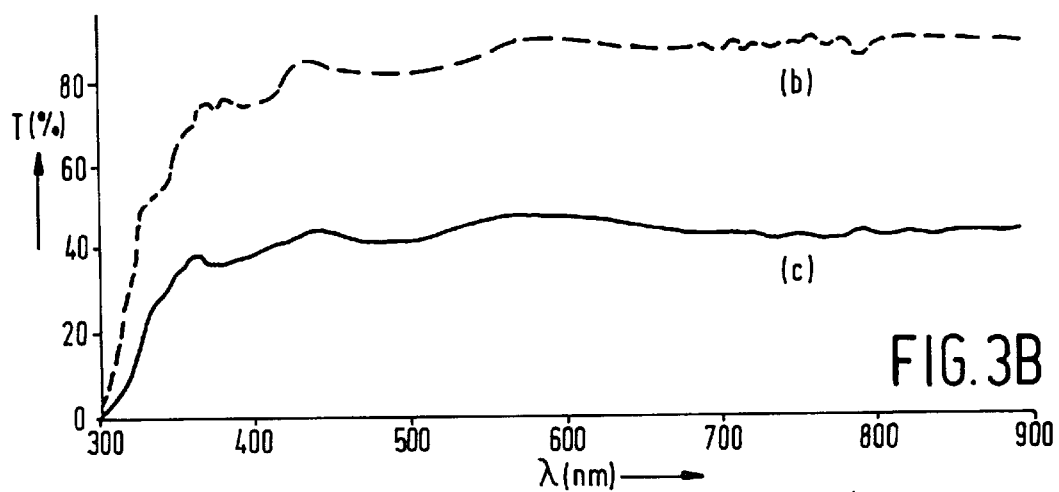
FIG. 3B shows the transmission spectrum as a function of the wavelength of an electrochromic layer $WO_3$, which includes 5 at. % of the metal oxide $V_2O_5$.

FIG. 3B shows a transmission spectrum as a function of the wavelength ($\lambda$ in nm) of an electrochromic layer $WO_3$, which contains approximately 5 at. % of the metal oxide $V_2O_5$. The spectrum, designated (b), corresponds to the state in which no guest atoms are incorporated in the electrochromic layer ("bleached state") and corresponds, apart from differences in thickness between the layers, to the curve (b) in FIG. 3A. The spectrum, designated (c) in FIG. 3B, corresponds to the state in which a (substantial) concentration of guest atoms is incorporated in the electrochromic layer ("colored"). In the example of FIG. 3B, the thickness of the electrochromic layer is approximately 270 nm and spectrum (c) is recorded, after intercalation of the layer for approximately 50 seconds at a voltage of 2.0 V. In the uncolored state (b), the layer is transparent and colorless (the wave motions in the transmission spectrum are caused by interference effects), whereas in the colored state (c) the electrochromic layer behaves like a color-neutral layer, the transmission of which has decreased to approximately 40% throughout the visible region. If use is made of such a layer, the ratio between the intensities of the primary colors of a display device, which are emitted, for example, by the phosphor elements, are not influenced, so that disturbing color differences are precluded.

Figure 3C:
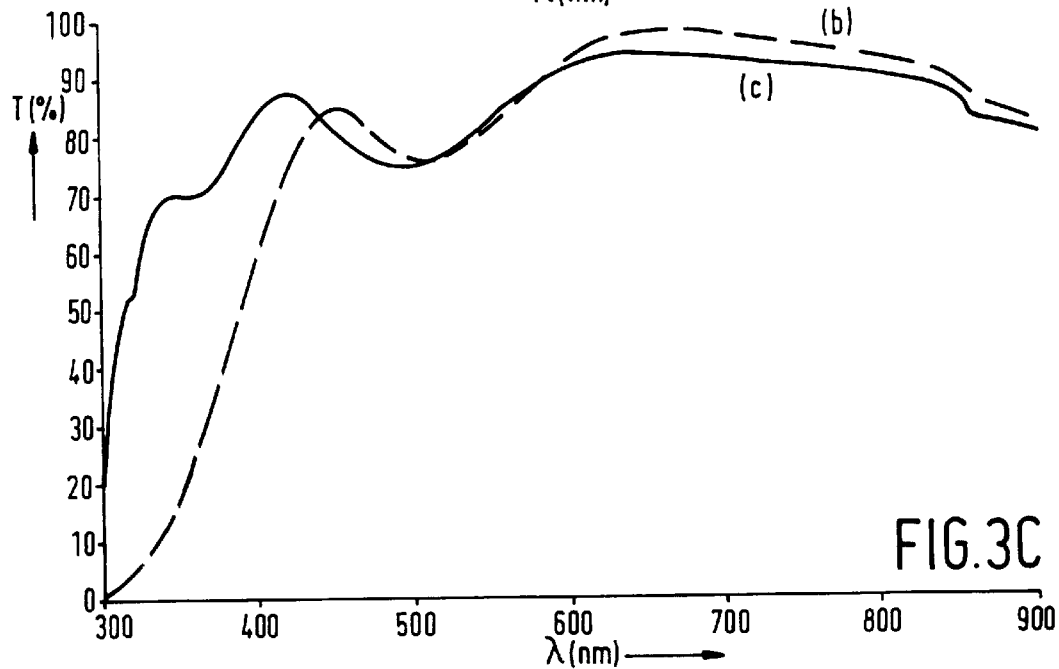
FIG. 3C shows the transmission spectrum as a function of the wavelength of an electrochromic layer $WO_3$, which includes 30 at. % of the metal oxide $V_2O_5$.

FIG. 3C shows a transmission spectrum as a function of the wavelength ($\lambda$ in nm) of a (thin) electrochromic layer $WO_3$, which contains approximately 30 at. % of the metal oxide $V_2O_5$. The spectrum, designated (b), corresponds to the state in which no guest atoms are incorporated in the electrochromic layer ("bleached state"); the spectrum, designated (c), corresponds to the state in which a (substantial) concentration of guest atoms is incorporated in the electrochromic layer ("colored"). In the example of FIG. 3C, the thickness of the electrochromic layer is approximately 160 nm and spectrum (c) is recorded after the layer has been intercalated for approximately 50 seconds at a voltage of 2.0 V. In the uncolored state (b) and in the colored state (c), the layer is transparent and substantially colorless (the wave motions in the transmission spectrum are caused by interference effects). The difference between spectrum (b) and spectrum (c) in FIG. 3C in the UV-range of the visible spectrum hardly have any effect on the coloration of the electrochromic layer.

Figure 4:
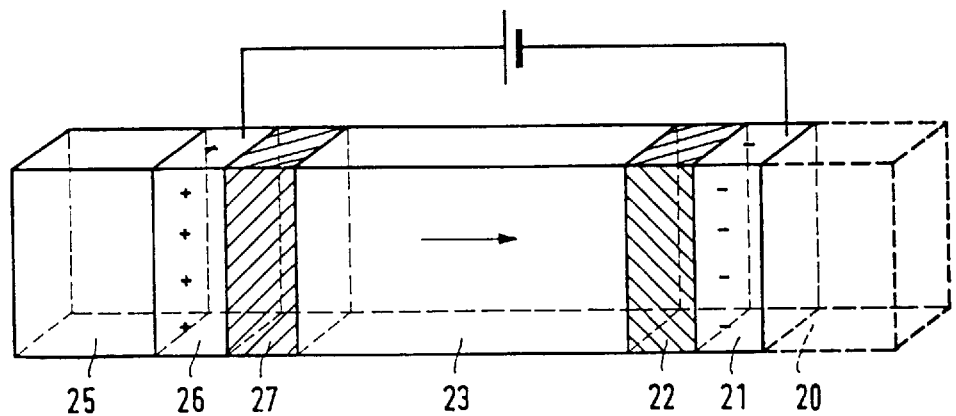
FIG. 4 is a partly perspective view of an embodiment of a color-neutral electrochromic element in accordance with the invention.

FIG. 4 is a very schematic, partly perspective view of an embodiment of a color-neutral, electrochromic element in accordance with the invention. Said element includes two half cells, which are interconnected ("laminated") via a polymeric electrolyte 23. The first half cell comprises a transparent substrate 20, for example glass, a transparent conductor 21, for example ITO (indium tin oxide) and an electrochromic layer 22 in accordance with the invention. In this example, the electrochromic layer comprises a mixture of $WO_3$ and $V_2O_5$. The second half cell comprises a transparent substrate 25, for example glass, a transparent conductor 26, for example ITO (indium tin oxide), and a so-called ion-storage layer 27, also referred to as counter electrode. A voltage difference is applied between the transparent conductors 21 and 26. In FIG. 4, substrate 20 is shown in dotted lines because said layer is generally omitted (for example in display devices). In this example, the counter electrode 27 comprises $V_2O_5$ and is responsible only for storing and releasing guest atoms, such as hydrogen, and alkali-metal atoms, such as $Li^+$ ions. In this example, the counter electrode 27 does not contribute to the change in color of the electrochromic element. The ion conductor is responsible for a rapid transport of the guest atoms and, preferably, has a high resistance to electroconduction. The mixed oxide $WO_3/V_2O_5$ in the electrochromic layer 22 serves to ensure that, upon applying a voltage difference across the element, the transmission properties undergo a reversible change from (colorless) transparent to (color neutral) grey.

In this example, the electrochromic layer 22 and the counter electrode 27 are provided by means of standard sputtering techniques ("reactive DC magnetron sputtering"). The layer thickness amounts to 300 nm for the mixed oxide $WO_3/V_2O_5$ and to 90 nm for $V_2O_5$, the concentration of V as a percentage of the total number of metal atoms in the mixture amounting to approximately 3 at. %. The two half cells are laminated via a polymeric electrolyte 23 which contains, for example, a mixture of polyethylene oxide (peo) and polymethyl meta-acrylate (pmma) and a specific quantity of $LiClO_4$, said polymeric electrolyte having an ionic conductivity of approximately $10^{-4}$ S/cm. The thickness of said polymeric electrolyte 23 is approximately 10 $\mu$m, and the moving ions in the polymeric electrolyte 23 are indicated by the arrow in FIG. 4.

Figure 5:
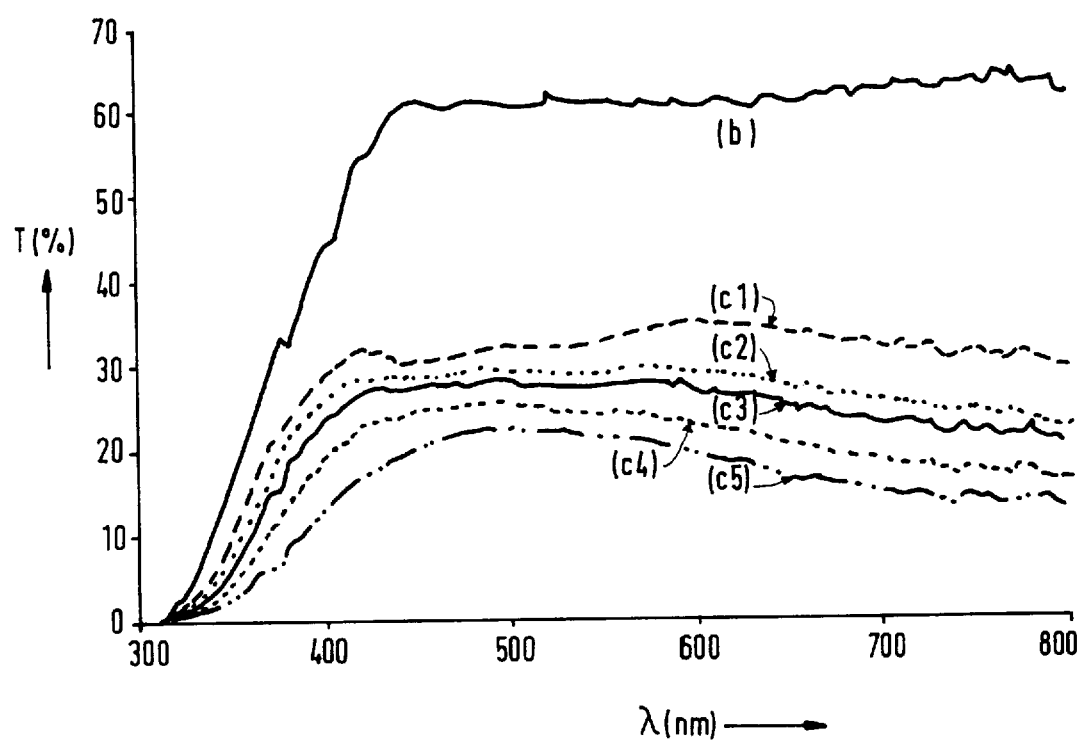
FIG. 5 shows the transmission spectrum of the electrochromic element of FIG. 4, as a function of the wavelength and of the applied voltage.

FIG. 5 shows the transmission spectrum of the electrochromic element of FIG. 4 as a function of the wavelength and of the applied voltage. The curve, designated (b), corresponds to the transmission spectrum of the element in the uncolored state. The application of a (cathodic) voltage to the electrochromic layer 22 (see FIG. 4) leads to a decrease of the transmission throughout the visible region, so that the electrochromic element obtains a greyish appearance. The curve designated (c1) corresponds to an applied voltage of −0.8 V, curve (c2) corresponds to an applied voltage of −1.0 V, curve (c3) corresponds to an applied voltage of −1.2 V, curve (c4) corresponds to an applied voltage of −1.4 V and curve (c5) corresponds to an applied voltage of −1.6 V. The application of an (anodic) voltage of approximately +1.0 V to the electrochromic layer 22 (see FIG. 4) causes decoloration of the electrochromic element, and the element acquires a transmission spectrum which corresponds to curve (b) in FIG. 5.

It will be obvious that within the scope of the invention many variations are possible to those skilled in the art. For example, apart from sputtering and vapor deposition, also wet-chemical ("sol-gel") deposition techniques can be used to manufacture electrochromic layers. Suitable deposition techniques include spin coating, dip coating and spray techniques.

In general, the invention relates to an electrochromic element comprising an electrochromic layer whose transmission properties change when a voltage difference is applied across the element. The electrochromic layer contains a first metal oxide of the group formed by $WO_3$, $MoO_3$, $Nb_2O_5$, $MnO_2$ and $ZrO_2$ (and combinations thereof) and a second metal oxide containing $V_2O_5$, $TiO_2$ and/or $ZnO$. If the concentration of the second metal in the mixture ranges from 1 to 15 at. %, preferably from 3 to 10 at. %, the electrochromic layer is transparent and colorless if no guest atoms are incorporated in the layer, and it is (color-neutral) grey if a substantial concentration of guest atoms is incorporated in the layer.

We claim:

1. An electrochromic element comprising an electrochromic layer (22), the transmission properties of the electrochromic layer (22) in the visible region undergoing a change when a voltage difference is applied across the element, characterized in that the electrochromic element (22) comprises a mixture of a first metal oxide of a metal selected from the group formed by tungsten, molybdenum, niobium, manganese, zirconium, and combinations thereof, and of a second metal oxide of a metal selected from the group formed by vanadium, titanium, zinc, and combinations thereof, and in that the concentration of the second metal, expressed as a percentage of the total number of metal atoms in the mixture, ranges from 1 to 15 at.%.

2. An electrochromic element as claimed in claim 1, characterized in that the concentration of the second metal in the mixture ranges from 3 to 10 at. %.

3. An electrochromic element as claimed in claim 1, characterized in that for the first metal oxide of the mixture use is made of $WO_3$.

4. An electrochromic element as claimed in claim 1, characterized in that for the second metal oxide of the mixture use is made of $V_2O_5$.

5. An electrochromic element as claimed in claim 1, characterized in that the color-point coordinates (x,y) of the electrochromic layer (22) are situated in the C.I.E. color triangle between 0.3 and 0.37, preferably between 0.31 and 0.35.

6. An electrochromic element as claimed in claim 1, characterized in that the transmission of the electrochromic layer (22) in the visible region changes gradually.

7. An electrochromic element as claimed in claim 1, characterized in that the minimum transmission of the electrochromic layer (22) is 15 %.

8. An electrochromic element as claimed in claim 1, characterized in that, upon application of a voltage difference, a change in the transmission of the electrochromic layer (22) takes place in less than 5 minutes, preferably less than 1 minute.

9. A display device comprising a display screen and an electrochromic element as claimed in claim 1.

10. A display device as claimed in claim 9, characterized in that the electrochromic element is provided on the outer surface of the display screen.

\* \* \* \* \*